(12) United States Patent
Fujita et al.

(10) Patent No.: US 8,666,439 B2
(45) Date of Patent: Mar. 4, 2014

(54) SCHEDULER, RADIO BASE STATION APPARATUS INCLUDING THE SCHEDULER, AND SCHEDULING METHOD

(75) Inventors: Hiroshi Fujita, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1278 days.

(21) Appl. No.: 11/808,662

(22) Filed: Jun. 12, 2007

(65) Prior Publication Data

US 2008/0014976 A1  Jan. 17, 2008

(30) Foreign Application Priority Data

Jul. 11, 2006  (JP) ................................. 2006-190462

(51) Int. Cl.
*H04Q 7/30* (2006.01)

(52) U.S. Cl.
USPC ........................................ 455/513; 370/395.4

(58) Field of Classification Search
USPC ................... 455/513, 500, 509, 452.1, 452.2; 370/329, 330, 395.4, 230
See application file for complete search history.

(56) References Cited

U.S. PATENT DOCUMENTS

| | | | |
|---|---|---|---|
| 7,245,946 B2 * | 7/2007 | Liu ................................ | 455/574 |
| 7,616,658 B2 | 11/2009 | Harada et al. | |
| 2002/0176380 A1 * | 11/2002 | Holtzman et al. ............ | 370/329 |
| 2003/0095538 A1 * | 5/2003 | Kayama et al. ............... | 370/350 |
| 2003/0161323 A1 | 8/2003 | Harada et al. | |
| 2005/0259661 A1 * | 11/2005 | Ishii et al. ................... | 370/395.4 |
| 2008/0069046 A1 * | 3/2008 | Ishii et al. ..................... | 370/330 |
| 2009/0067376 A1 * | 3/2009 | Ishii et al. ..................... | 370/329 |

FOREIGN PATENT DOCUMENTS

| | | |
|---|---|---|
| JP | 2003-152630 | 5/2003 |
| JP | 2003-179965 | 6/2003 |
| JP | 2003-259447 | 9/2003 |
| JP | 2004-320254 | 11/2004 |
| JP | 2006-516871 | 7/2006 |
| WO | WO 2004/070996 | 8/2004 |

OTHER PUBLICATIONS

Japanese Office Action mailed Sep. 27, 2011 for corresponding Japanese Application No. 2006-190462, with English-language translation.
A. Jalali, R. Padovani, R. Pankaj, "Data Throughput of CDMA-HDR a High Efficiency-High Data Rate Personal Communication Wireless System", VTC2000 Spring; May 2000.
Nortel Networks, "Nortel Networks' Reference Simulation Methodology For The Performance Evaluation of OFDM/WCDMA In UTRAN", R1-03-0785, 3GPP TSG RAN WG1#33; Aug. 2003.

* cited by examiner

*Primary Examiner* — Patrick Edouard
*Assistant Examiner* — Myron K Wyche
(74) *Attorney, Agent, or Firm* — Fujitsu Patent Center

(57) ABSTRACT

In the scheduler, for each of the mobile terminals which are the objects of scheduling, calculation is performed of an evaluation value relating to the priority of allocation of radio resources by means of a predetermined evaluation formula including radio quality information relating to radio quality between a base station and the mobile terminal; and controlling is performed of the evaluation value of a mobile terminal whose instantaneous radio quality is evaluated to be lower than the required radio quality by said radio quality evaluating means, to a value lower than an evaluation value of a mobile terminal whose instantaneous radio quality is evaluated to be equal to or higher than the required radio quality. As a result, it becomes possible to realize effective use of radio resources following the instantaneous variation of radio quality and to assure the coverage of a cell.

15 Claims, 13 Drawing Sheets

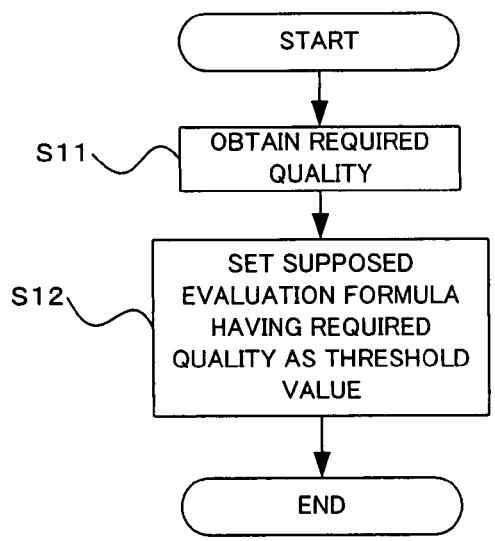
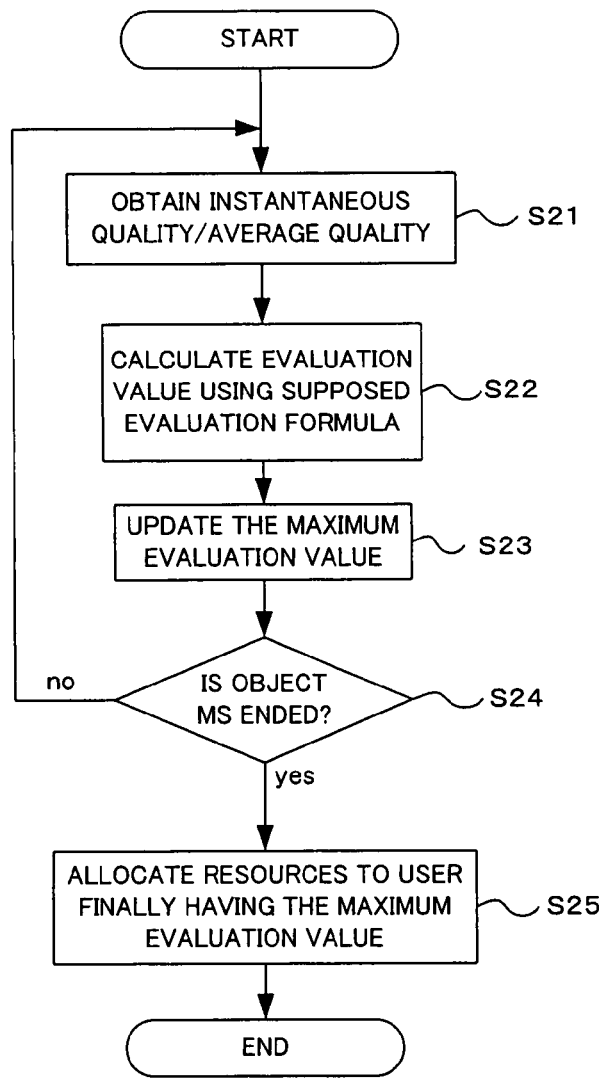
FIG. 3(A)
FIG. 3(B)

SCHEDULER, RADIO BASE STATION APPARATUS INCLUDING THE SCHEDULER, AND SCHEDULING METHOD

CROSS REFERENCE TO RELATED APPLICATION

This application is based on and hereby claims priority to Japanese Application No. 2006-190462 filed on Jul. 11, 2006 in Japan, the contents of which are hereby incorporated by reference.

BACKGROUND OF THE INVENTION (1) Field of the Invention

The present invention relates to a scheduler, a radio base station apparatus including the scheduler, and a scheduling method. The invention relates to, for example, technology suitable for use in a radio base station apparatus in a radio mobile communication system.

(2) Description of the Related Art

In a radio mobile communication system using packet communication, communication quality is monitored, and control is performed so that the transmission speed and the modulation method suitable for communication quality are adaptively selected. The reason of change in communication quality is variation in radio propagation environment, and it is often occurred that radio quality is instantly becomes lower than the required radio quality in the mobile radio system.

When radio propagation environment is deteriorated, an error rate in a radio segment becomes high. Thus, in the radio layer, methods of lowering the error rate are performed such as decreasing transfer information amount, increasing the error correction information, or using a modulation scheme high in error resilience. In addition, when the error rate in a radio segment becomes high, opportunities of transmission of NACK which indicates abnormal reception on the reception end are increased, and the turn-around of the packet is lengthened. Therefore, in the upper layer, measurement of ACK/NACK and measurement of turn around time of a packet are performed. In this manner, communication quality is monitored, thereby performing controlling of allocation of radio resources (sub-carrier frequency, etc.) to satisfy the required quality.

Further, in MAC (Media Access Control) layer or a physical layer, using a scheduler which performs allocation of radio resources, the priority in consideration of radio quality is calculated. In accordance with the priority, controlling to allocate radio resources to users is performed, so that the system use efficiency (use efficiency of radio resources) is improved. Hereinafter, a function for calculating the priority will be called an evaluation formula.

As scheduling for allocating radio resources, there is a representative algorism of Maximum Carrier-to-Interference-Ratio (MaxCIR) (see paragraph [0006] of the following patent document 1). The MaxCIR method is a method in which radio resources are always allocated to a user who is the best in instantaneous radio quality [CIR or SINR (Signal-to-Interference-plus-Noise-power-Ratio) at the time scheduling is performed. According to the MaxCIR method, since radio resources are allocated to users good in radio quality, the error rate in a radio segment is low and the system throughput becomes the maximum. As to the use efficiency of the system, the MaxCIR method realizes the highest system throughput. Hence, it is the method realizing the outstanding merit for an operator of the radio system.

However, the MaxCIR method causes a blind sector in which communication is not available, because radio resources are not allocated to users located in an area, such as a cell edge, in which radio quality is poor. Hence, in a case where plane-like service such as a cellular system is required, additional base stations for compensating for the blind sector are required.

Further, the Proportional Fairness (PF method) is also a well-known scheduling algorism (see paragraph [0007] of patent document 1 and the following non-patent document 1). According to the PF method, radio resources are allocated to users with good instantaneous radio quality with respect to average radio quality. Thus, since radio resources are allocated to all the users in a similar manner regardless of the instantaneous radio quality, fairness among the users is high. Hence, since radio resources are allocated to users located at cell edges, the number of blind sector becomes small, so that plane-like service is realized with base stations lower in number than MaxCIR.

Further, an algorism called the Generalized PF (GPF) method (see the following non-patent document 2) is also well-known. According to the GPF method, using the following formula (1), radio resources are allocated to a user having the highest result of the evaluation formula.

$$\text{value} = \frac{S_{ins}^{\alpha}}{S_{ave}^{\beta}} \quad (1)$$

Here, $S_{ins}$ indicates instantaneous radio quality; Save indicates average radio quality. The case of $\alpha=1$, $\beta=0$ corresponds to the MaxCIR method, and the case of $\alpha=\beta=1$ corresponds to the PF method. That is, the GPF method is a method in which balance between improvement and fairness of the system user efficiency can be changed by means of parameters $\alpha$ and $\beta$ on the basis of the PF method. For example, if $\beta$ is greater than a, users with lower average radio quality are allocated at high probability, so that even users whose quality is poor are allocated with high probability, and fairness of throughput among users is improved.

Here, when such fairness is assured, the priority of users poorer in radio quality are higher, and thus, the fairness is assured with low throughput, so that the system use efficiency becomes poor.

[Patent Document 1] Japanese Patent Application Laid-open No. 2003-152630

[Non-patent Document 1] A. Jalai, R. Padovani, R. Pankaj, "Data Throughput of CDMA-HDR a High Efficiency-High Data Rate Personal Communication Wireless System", VTC2000 Spring, May 2000

[Non-patent Document 2] Nortel Networks, "Nortel Networks' reference simulation methodology for the performance evaluation of OFDM/WCDMA in UTRAN", R1-03-0785, 3GPP TSG RAN WG1#33, August 2003

To use radio resources effectively, although it is important to monitor communication quality so as to control transmission using appropriate transmission speed and modulation method, instantaneous radio quality exceeding the predetermined error rate can appear due to instantaneous variation. According to the previous methods, even if the instantaneous variation becomes lower than the required radio quality, radio resources are allocated when the priority (hereinafter will be called the evaluation value) of radio resource allocation calculated by the scheduler is high. Even in such a case, since the upper layer monitors and controls communication quality, the radio quality becomes stable in average. However, since the upper layer is in charge of controlling, the control delay is large. When the control delay is large, instantaneous variation of radio quality cannot be followed up. Thus, radio resources are used in vain during control delay. In addition, since NACK occurs a lot, the traffic is suppressed.

On the other hand, to realize plane-like service, a scheduling method with a coverage as large as possible needs to be employed. Although in the PF method, the system throughput is lowered since radio resources are allocated to users low in radio quality, an operator is forced to use the PF method in order to ensure the coverage of a cell.

SUMMARY OF THE INVENTION

With the foregoing problems in view, it is an object of the present invention to make it possible to realize effective use of radio resources following the instantaneous variation of radio quality and to assure the coverage of a cell.

In order to accomplish the above object, according to the present invention, the following scheduler, the following radio base station apparatus including the scheduler, and the following scheduling method are provided.

(1) As a generic feature, there is provided a scheduler which allocates radio resources to mobile terminals in a radio mobile communication system, the scheduler comprising: evaluation value calculating means which calculates, for each of the mobile terminals which are the objects of scheduling, an evaluation value relating to the priority of allocation of radio resources by means of a predetermined evaluation formula including radio quality information relating to radio quality between a base station and the mobile terminal; radio quality evaluating means which evaluates whether or not instantaneous radio quality is equal to or higher than required radio quality; and control means which controls the evaluation value of a mobile terminal whose instantaneous radio quality is evaluated to be lower than the required radio quality by the radio quality evaluating means, to a value lower than an evaluation value of a mobile terminal whose instantaneous radio quality is evaluated to be equal to or higher than the required radio quality.

(2) As a preferred feature, the scheduler further comprises evaluation value distribution control means which gives, to the evaluation value formula, a parameter for controlling the region of the maximum value and the dispersion as distribution characteristics of the evaluation value with respect to the instantaneous radio quality.

(3) As another preferred feature, the evaluation value distribution controlling means controls the distribution characteristics of the evaluation value with respect to the instantaneous radio quality, corresponding to the statistical distribution of the instantaneous radio quality with respect to the mobile terminal of the radio mobile communication system.

(4) As yet another preferred feature, the scheduler further comprises instantaneous radio quality predicting means which predicts instantaneous radio quality at the time when transmission is performed to the mobile terminal on the basis of the past instantaneous radio quality of the mobile terminal, and gives the prediction value of the evaluation value to the evaluation value calculating means as the radio quality information of the evaluation formula.

(5) As a further preferred feature, the mobile terminal is a terminal which performs retransmission combination with respect to a reception signal; and the mobile terminal further comprises retransmission-time required quality controlling means which controls the required radio quality in the lowering direction corresponding to the gain obtained by the retransmission combination.

(6) As a still further preferred feature, the radio mobile communication system is a system in which coding of a transmission signal to the mobile terminal is repeatedly performed, and the system further comprises repetition coding-time required quality controlling means which controls the required radio quality so as to be lowered by a gain obtained by the repetition coding.

(7) As a yet further preferred feature, the evaluation value distribution controlling means includes: a distribution detecting unit which detects change in the statistical distribution; a parameter resetting unit which dynamically resets, when the distribution detecting unit detects the above-mentioned change, parameters relating to the calculation of the evaluation value in accordance with the characteristics after the above-mentioned change.

(8) As a further feature, the scheduler further comprises an abnormal reception-time required quality controlling means which controls, when a signal indicating abnormal reception is received from the mobile terminal, the required radio quality in the lowering direction.

(9) As another generic feature, there is provided a radio base station apparatus comprising a scheduler as set forth in any one of the above item (1) through (8) and transmitting means which performs transmission to the mobile terminal using the radio resources allocated by the scheduler.

(10) As yet another generic feature, there is provided a scheduling method in which radio resource is allocated to radio terminals in a radio mobile communication system, the method comprising: an evaluation value calculating step which calculates, for each of the mobile terminals which are the objects of scheduling, an evaluation value relating to the priority of allocation of radio resources by means of a predetermined evaluation formula including radio quality information relating to radio quality between a base station and the mobile terminal; a radio quality evaluating step which evaluates whether or not instantaneous radio quality is equal to or higher than required radio quality; and a controlling step which controls the evaluation value of a mobile terminal whose instantaneous radio quality is evaluated to be lower than the required radio quality at the radio quality evaluating step, to a value lower than an evaluation value of a mobile terminal whose instantaneous radio quality is evaluated to be equal to or higher than the required radio quality.

The above-described invention guarantees at least any of the following advantageous results.

(1) Since radio resources allocation to mobile terminals (users) whose instantaneous radio quality is lower than the required radio quality is prevented, communication lower in error rate is increased, so that a radio service area (coverage) is assured and the system use efficiency is improved. In addition, using the instantaneous radio quality and the required radio quality in determining communication quality to control so that the physical layer satisfies the required radio quality, and so that control delay is small.

(2) Further, by means of setting an area in which the above-mentioned evaluation value becomes the maximum and its dispersion, when the evaluation value peak is set in an area in which the instantaneous radio quality is high, allocation to users high in throughput is performed with high priority, so that it is possible to improve the use efficiency of radio resources. On the other hand, when the evaluation value peak is set to an area in which the instantaneous radio quality is low, allocation is performed to users lower in throughput with high priority. Since the number of times of allocation to users lower in throughput is increased, and the number of times of allocation to users higher in throughput is decreased. As a result, data amount transmitted by each user is averaged, and user throughput can be averaged. At that time, since allocation to users lower than the required radio quality is limited, packet loss does not often occur and the system throughput is assured.

(3) By means of using the instantaneous radio quality distribution of users in the radio mobile communication system for the evaluation value distribution, the evaluation values are distributed in agreement with the instantaneous radio quality distribution (statistic distribution) of users, the number of times of allocation to users located in an average environment in the system is increased, and the user throughput of users in an average environment is improved. Users located in a good radio environment can transmit a great amount of data at once, and thus, although the number of times of allocation becomes smaller, the average user throughput becomes almost equal to those of users located in an average radio environment, so that user throughput is averaged in the system.

(4) Since allocation can be performed in consideration of the scheduling delay from the time when instantaneous radio quality of users is calculated until transmission is actually performed, it is possible to prevent allocation to users whose instantaneous radio quality becomes lower than the required quality during the scheduling delay duration, so that radio resources can be effectively used.

(5) Even if radio quality at retransmission is lower than the required quality, it is possible to control the required radio quality of the evaluation formula in the direction lower than the original quality by means of using the fact that an error rate becomes low due to a gain resulting from retransmission combination at mobile terminals. In this case, communication of users lower in instantaneous radio quality becomes possible, and the coverage can be enlarged.

(6) It is possible to control the required radio quality of the evaluation formula in the direction lower than the original quality, by means of using a gain obtained by using repetition codes. In this case, also, it becomes possible for users lower in instantaneous radio quality to communicate, so that the coverage is enlarged.

(7) Since parameters relating to calculation of the evaluation value can be dynamically reset in agreement with change in instantaneous radio quality distribution (statistic distribution) in the system, it becomes possible to allocate radio resources always with the optimal evaluation value distribution. Thus, it is possible to support (follow up) change in a radio environment such as that due to movement of users.

(8) When a signal indicating abnormal reception is received from users (mobile terminals), the required radio quality is controlled in a lowering direction, so that it becomes possible to communicate with users lower in instantaneous radio quality, and so that the coverage can be enlarged.

The above and other objects and features of the present invention will be understood by reading carefully the following description with accompanying drawings. Preferred embodiments of the preset invention will be described in more detail referring to the accompanying drawings. The drawings are illustrative and are not to be limitative of the scope of the present invention.

BRIEF DESCRIPTION OF THE DRAWINGS

Each of FIG. 3(A) and FIG. 3(B) is a flowchart for describing a second mode of scheduling processing by the scheduler of the radio base station apparatus of FIG. 1;

DESCRIPTION OF THE PREFERRED EMBODIMENT(S)

Preferred embodiments of the present invention are described in more detail below referring to the accompanying drawings.

Here, the present invention should by no means be limited to the embodiment described below, and various changes or modifications may be suggested without departing from the gist of the invention.

[A] One Preferred Embodiment

Figure 1:
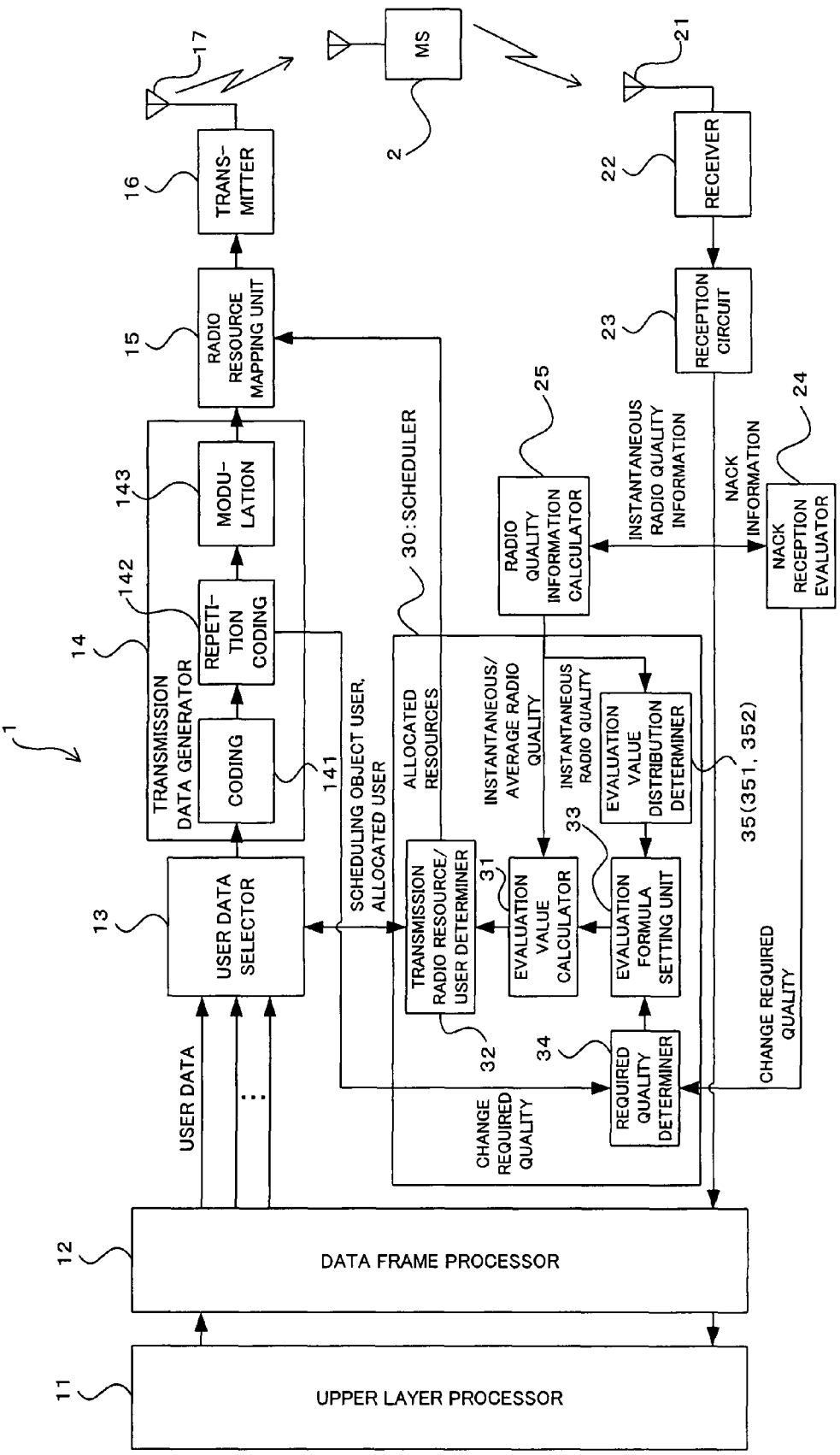
FIG. 1 is a block diagram showing an important construction of a radio base station according to one preferred embodiment of the present invention.

FIG. 1 is a block diagram showing an important construction of a radio base station apparatus (hereinafter will be simply called the "base station") according to one preferred embodiment of the present invention. The base station 1 of FIG. 1 communicates with more than one mobile terminal (mobile station: MS) 2 by radio link (downlink from the base station 1 to the MS 2 and uplink which is its opposite direction). The base station 1 includes, for example, an upper layer processor 11, a data frame processor 12, a user data selector 13, a transmission data generator 14, a radio resource mapping unit 15, a transmitter 16, a transmission antenna 17, a reception antenna 21, a receiver 22, a reception circuit 23, a NACK reception evaluator 24, a radio quality information calculator 25, and a scheduler 30. The transmission data generator 14 further includes a coding unit 141, a repetition coding unit 142, and a modulator 143. The scheduler 30 includes an evaluation value calculator 31, a transmission radio resource/user determiner 32, an evaluation formula setting unit 33, and a required quality determiner 34, and an evaluation value distribution determiner 35.

Here, the upper layer processor 11 is provided with known upper layer processing functions such as flow control, retransmission control, setting and release of a call, and location management of the MS 2. The data frame processor 12 stores downlink data which is processed by the upper layer processor 11 and is to be transmitted to the MS 2 until the data is taken out from the user data selector 13, and transfers uplink data which is received from the MS 2 to the upper layer processor 11 in a data format suitable for the upper layer.

The user data selector 13 selects transmission object user data specified by the scheduler 30, out of multiple streams of user data stored in the data frame processor 12. The transmission data generator 14 generates transmission data from user data selected by the user data selector 13. The coding unit 141 of the transmission data generator 14 performs coding of the selected user data into error correction codes such as turbo codes, etc., and the repetition coding unit 142 of the transmission data generator 14 performs repetition processing (bit repetition coding) for rate matching, and the modulator 143 of the transmission data generator 14 performs modulation with multiple value orthogonal modulation scheme such as QPSK and 16 QAM to generate transmission data.

The radio resource mapping unit 15 performs mapping of the transmission data generated by the transmission data generator 14 to radio resources (sub-carrier frequency, etc.) specified (allocated) from the scheduler 30. The transmitter 16 has functions of performing radio transmission processing to transmission data from the radio resource mapping unit 15 such as D/A conversion, frequency conversion (up-conversion) to radio frequency (RF), transmission power control. The transmission antenna 17 radiates the RF signal obtained by the transmitter 16 in air toward the MS 2.

That is, the block composed of the user data selector 13, the transmission data generator 14, the radio resource mapping unit 15, the transmitter 16 functions as a transmitter means for transmitting to the user (MS 2) by means of radio resources allocated by the scheduler 30.

On the other hand, the reception antenna 21 receives an uplink RF signal from the MS 2. The receiver 22 has functions of performing radio reception processing to the received RF signal received by the reception antenna 21 such as frequency conversion (down-conversion) to a base band signal and A/D conversion. The reception circuit 23 has functions of performing required reception signal processing (digital signal processing) on a received signal from the receiver 22 such as channel estimation, channel compensation, demodulation (error correction demodulation), and CRC check.

The NACK reception evaluator 24 evaluates whether or not a signal received by the reception circuit 23 is a NACK signal. In the present example, in response to reception of a NACK signal, scheduling processing by the scheduler 30 is controlled adaptively. This will be detailed later.

The radio quality information calculator 25 calculates, for each user (MS 2), a predicted value (hereinafter will also be called predicted radio quality information) of radio quality in consideration of an average value (average radio quality information) during a specific duration and scheduling delay, on the basis of downlink radio quality information (instantaneous value: hereinafter will also be called instantaneous radio quality information) received from the MS 2 and obtained by the reception circuit 23.

In this instance, the instantaneous radio quality information is obtained by means of decoding, by the reception circuit 23, the index relating to radio quality fedback uplink from the MS 2 such as the reception SINR and CQI (Channel Quality Indicator) in the MS 2. In a case of time-divisional multiplexing, the instantaneous radio quality information can also be obtained by means of measuring, by the reception circuit 23, uplink reception SINR. Although the radio quality information calculator 25 is provided outside the scheduler 30 in FIG. 1, it can be provided inside the radio quality information calculator 25, and it functions as a radio quality obtaining means which obtains radio quality between the base station and the MS 2.

The scheduler 30 determines, at each predetermined scheduling timing, for each radio frame, the user to whom radio resources are to be allocated and the radio resources to be allocated based on a predetermined evaluation formula, and gives the determined information (scheduling information) to the user data selector 13 and the radio resource mapping unit 15. In the present example, scheduling is performed in such a manner that a user with instantaneous radio quality lower than required radio quality is given an evaluation value (the priority of radio resource allocation) lower than a value given to a user with instantaneous radio quality higher than required radio quality.

In this instance, the "required radio quality" can be radio quality realizing a throughput of "0" when a radio quality vs. throughput characteristic is calculated in a combination of transmission parameters realizing the lowest throughput of the system. In addition, the "required radio quality" can also be radio quality realizing the target error rate set in the system in a radio quality vs. error rate characteristic in a combination of transmission parameters realizing the lowest throughput.

For the above purpose, the scheduler 30 is equipped with the above-described parts 31 through 35. The evaluation value calculator 31 calculates an evaluation value for each user by means of giving downlink instantaneous radio quality information or average radio quality information of each user obtained by the radio quality information calculator 25 to an evaluation formula, having been set by the evaluation formula setting unit 33, as an input parameter. The transmission radio resource/user determiner 32 determines a user with the maximum evaluation value, out of evaluation values calculated by the evaluation value calculator 31, as a user to whom radio resources are to be allocated. The transmission radio resource/user determiner 32 determines radio resources to be allocated to the user, and such information is given to the user data selector 13 and the radio resource mapping unit 15 as scheduling information.

Here, the evaluation value calculator 31 also has a function as a radio quality evaluating means which evaluates, as described later, whether or not instantaneous radio quality is not lower than required radio quality, and a function as a controlling means which controls the evaluation value of a user whose instantaneous radio quality is lower than the required radio quality to a value lower than the evaluation value of a user whose instantaneous radio quality is evaluated to be not lower than the required radio quality.

The evaluation formula setting unit 33 sets the abovementioned evaluation formula used by the evaluation value calculator 31. In the present example, it can set the required radio quality determined by the required quality determiner 34 and the distribution parameter determined by the evaluation value distribution determiner 35 to an evaluation formula. The concrete examples of the evaluation formula and the distribution parameter will be described later.

The required quality determiner 34 determines the above-mentioned required radio quality. In the present example, the required radio quality is adaptively controlled (updated) by the number of repetition in the repetition coding unit 142 and the detection of reception of NACK by the NACK reception evaluator 24.

The evaluation value distribution determiner (evaluation value distribution controlling means) 35 determines (controls) the above-mentioned distribution parameter. For example, using distribution (statistical distribution) obtained by summarizing instantaneous radio quality information in the system, the evaluation value distribution determiner 35 can dynamically determines (controls) the above-mentioned distribution parameters in accordance with variation of the instantaneous radio quality in the system.

Hereinafter, a description will be made of an overview of the operation of the base station 1 according to the present embodiment with the construction as described above. Downlink data (user data) destined to each MS 2, which is received from the required network such an IP (Internet Protocol) network and is processed by the upper layer processor 11, is stored in the data frame processor 12 until radio resources are allocated thereto. After radio resources are allocated, the user data selector 13 selects user data specified by the scheduling information from the scheduler 30 as data to be transmitted.

In the transmission data generator 14, the selected user data is coded into error correction codes such as turbo codes by the coding unit 141, and is repetition coded by the repetition coding unit 142, and further, is orthogonally modulated by the modulator 143 with the QPSK or 16 QAM, etc. Thus-obtained transmission data is mapped to radio resources specified by the scheduling information by the radio resource mapping unit 15, and is subjected to D/A conversion or radio transmission processing including up-conversion to an RF signal, etc., and is radiated from the transmission antenna 17 to the air toward the MS 2.

On the other hand, the uplink RF signal transmitted from the MS 2 is received by the reception antenna 21. The received signal is subjected to radio reception processing including down-conversion to a base band signal and A/D conversion, and is subjected to digital signal processing such as channel estimation, channel compensation, demodulation, and decoding. The reception signal (decoded data) thus obtained is converted into a data format suitable for the upper layer by the data frame processor 12, and transferred to the upper layer processor 11, and transferred to a required network such as and IP network.

Here, in the scheduler 30, at predetermined scheduling timings, the evaluation value calculator 31 performs evaluation value calculation for each object user, using an evaluation formula determined by the required quality determiner 34 and to which required radio quality is set by the evaluation formula setting unit 33. In addition, the transmission radio resource/user determiner 32 determines allocated users and allocated radio resources in order of users higher in evaluation value obtained for each user.

The determined information is given to the user data selector 13 and the radio resource mapping unit 15 as the above-mentioned scheduling information. Hereby, as described above, user data to be transmitted is selected by the user data selector 13, and this user data is coded and modulated by the transmission data generator 14, and is mapped to radio resources by the radio resource mapping unit 15. Further, after processing of all the radio resources and transmission data is finished, downlink transmission data is sent through the transmitter 16 and the transmission antenna 17 toward the MS 2.

(A1) First Mode of Scheduling Processing

Figure 2:
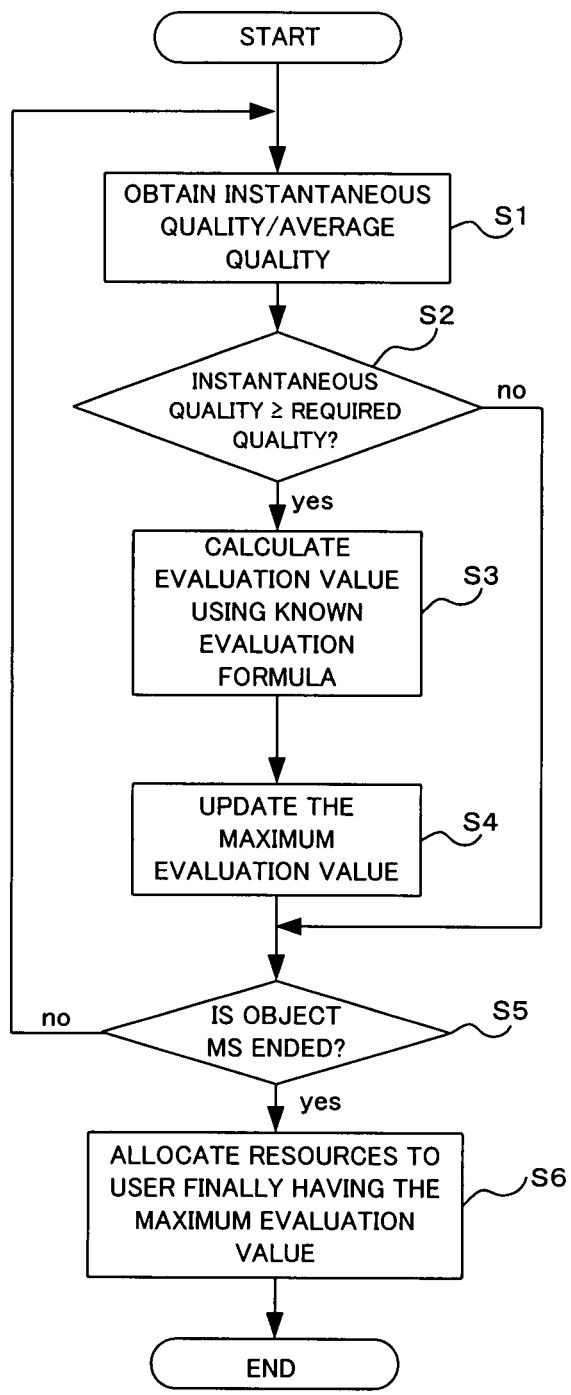
FIG. 2 is a flowchart for describing a concrete example (first mode) of scheduling processing by a scheduler of the radio base station apparatus of FIG. 1.

Next, referring to FIG. 2, a description will be made of a concrete example of scheduling processing by the scheduler 30.

First of all, the scheduler 30 (evaluation value calculator 31) obtains, from the radio quality information calculator 25, the instantaneous radio quality information and the average radio quality information of an MS 2 which is an object of scheduling (step S1). The scheduler 30 compares the instantaneous radio quality information with required radio quality information, determined by the required quality determiner 34 and set by the evaluation formula setting unit 33, and evaluates whether or not the instantaneous radio quality is not lower than the above mentioned required radio quality (step S2).

As a result, when the instantaneous radio quality is not lower than the required radio quality (if determined yes by step S2), the evaluation value calculator 31 calculates an evaluation value by means of the predetermined evaluation formula on the basis of the instantaneous radio quality information and average radio quality information for each frame (step S3). In this instance, as an evaluation formula, here, an evaluation formula which realizes the allocation opportunity for all of the users, for example, a known method such as the PF method, can be applied.

On the other hand, when the instantaneous radio quality is lower than the required radio quality (if no evaluation result is obtained in step S2), the evaluation value calculator 31 does not perform calculation of the evaluation value with the above-mentioned evaluation formula. That is, in the case, evaluation value calculation is not performed with respect to the user (MS 2) whose instantaneous radio quality is smaller than the required radio quality, thereby controlling the evaluation value to a value lower than the evaluation value with respect to the user whose evaluation value is not lower than the required radio quality ("0", that is, the allocation priority is the lowest).

Here, the evaluation value obtained by calculation by the above evaluation formula is stored in a storage medium such as a non-illustrated internal memory or register, and is updated successively to the maximum evaluation value (step S4). That is, after calculating the evaluation value, the evaluation value calculator 31 compares an evaluation value with a provisional maximum evaluation value in the above-mentioned storage medium. If the current calculated evaluation value is greater, the provisional maximum evaluation value is replaced (updated) by the present calculated evaluation value, and the present user is registered as a provisionally allocated user.

Further, the transmission radio resource/user determiner (hereinafter will be also simply called the "determiner") 32 determines whether or not an evaluation value calculation is completed with respect to all the users (step S5). If the calculation is not calculated (if determined no in step S5), the processing after the above-mentioned step S1 is repeated until the evaluation value calculation with respect to all the object users is repeated (until determined yes by step S5). After the evaluation value calculation is completed with respect to all the users, a user (finally, having the maximum evaluation value stored in the above-mentioned storage medium) who is finally registered as a provisional allocated user as a user to whom radio resource is to be allocated (yes route of step S5 to step S6). In this instance, as the scheduling object user, as the user data stored in the data frame processor 12 can be recognized through the user data selector 13, the transmission radio resource/user determiner 32 receives the information from the user data selector 13, thereby specifying the number of scheduling object users, the transmission radio resource/user determiner 32 can specify the number of users upon reception of the information from the user data selector 13.

Following the above mentioned scheduling processing, radio resources are allocated in the order of evaluation value with respect to users whose instantaneous radio quality is not lower than the required quality, and radio resources are not allocated or becomes difficult to be allocated to users whose instantaneous radio quality is lower than the required quality.

In this manner, in the present example, monitoring of the communication quality which was previously performed by the upper layer is performed by monitoring instantaneous radio quality as communication quality. In order to perform such monitoring by the scheduler 30, the scheduler 30 is given information[parameter (threshold)] about instantaneous radio quality such as required radio quality.

Since an evaluation formula, such as the PF scheme, which gives all the user allocation opportunity is used, it is possible for users located at cell edges to communicate regardless of instantaneous radio quality, and it is also possible to assure the required coverage. In addition, according to the scheduling scheme of the present example, since it is possible to suppress allocation of radio resources to users whose instantaneous radio quality is lower than the required quality, it is possible to obtain effects that communication with lower erroneous rate is increased, and that both of the coverage and the improvement in the system use effects are assured.

In addition, using the instantaneous radio quality and the required quality in evaluation of communication quality, it is possible to control so that a physical layer satisfies the required quality, and thus, a control delay is small. Generally speaking, when given the same number of allocation, the higher the instantaneous radio quality, the higher the throughput. On the other hand, the lower the instantaneous radio quality, the lower the throughput.

(A2) Second Mode of Scheduling Processing

Next, referring to FIG. 3(A) and FIG. 3(B), a description will be made of a second mode of scheduling processing by the scheduler 30.

According to the scheduling scheme of the present example, the evaluation formula setting unit 33 obtains required radio quality (hereinafter will be simply called the "required quality") determined by the required quality determiner 34 as shown in FIG. 3(A) (step S11), and registers (sets) the required quality in the scheduling formula used in the evaluation value calculator 31 as a threshold value (step S12). The present scheduling evaluation formula is an evaluation formula in which an evaluation value becomes small when the instantaneous radio quality is not greater than the required quality, and in which an evaluation value becomes great when the instantaneous radio quality is not smaller than the required quality. For example, the evaluation formula expressed by the following formula (2) in which the PF scheme is deformed cab be applied. Further, another evaluation formula other than the following formula can also be used.

$$\text{value} = \begin{cases} \dfrac{S_{ins}}{S_{ave}} & S_{ins} \geq S_{thr} \\ 0 & S_{ins} < S_{thr} \end{cases} \quad (2)$$

Where value indicates an evaluation value; $S_{ins}$ indicates instantaneous radio quality; $S_{ave}$ indicates average radio quality; $S_{thr}$ indicates required radio quality (hereafter will also be simply called "required quality"). That is, in this evaluation formula (2), when the instantaneous radio quality is not higher than the required quality, the evaluation value takes a value of "0", and allocation priority becomes the lowest.

Next, at scheduling timing, the scheduler 30 starts an evaluation value calculation loop to each user to be subjected to scheduling. That is, as shown in FIG. 3(B), the evaluation value calculator 31 obtains, from the radio quality information calculator 25, instantaneous radio quality information and average radio quality information with respect to an MS 2 to be subjected to scheduling (step S21), and calculates evaluation value using the above evaluation formula (2) (step S22), and updates a provisional maximum evaluation value based on the obtained evaluation value (step S23). That is, when the present calculated value is greater than the provisional evaluation value, the provisional maximal evaluation value is updated to the present calculated value. In addition, the user who is subjected to the present evaluation value calculation is registered as a provisional allocation user.

Then, the determiner 32 evaluates whether or not evaluation value calculation is completed for all the users (step S24). If the evaluation result is negative (if no evaluation result is obtained at step S24), the processing of S21 and afterward is repeated until evaluation value calculation is completed for all the subject users (until evaluated yes at step S24). When evaluation value calculation is completed for all the users, a user who is finally registered as a provisional allocation user is determined as a user to whom radio resources are to be allocated (from yes route of step S24 to step S25).

In this manner, according to the scheduling processing of the present example, calculation is performed so that the evaluation value of a user whose instantaneous radio quality is lower than the required radio quality is smaller than the evaluation value of a user whose instantaneous radio quality is not lower than the required radio quality, and the former user is given lower radio resource allocation priority. Thus, effects and benefits equal to the scheduling processing of the above-described first mode are obtained.

(A3) Third Mode of Scheduling Processing

Figure 4:
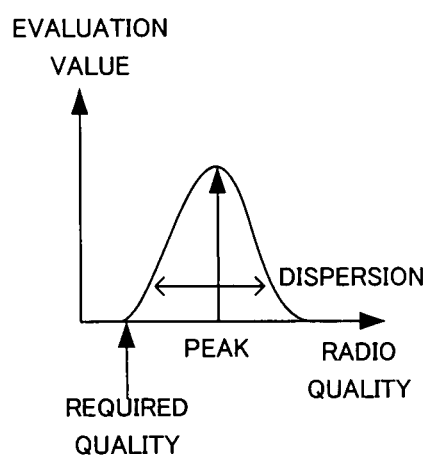
FIG. 4 is a diagram showing an example of evaluation value distribution with respect to instantaneous radio quality for describing a third mode of scheduling processing by the scheduler of the radio base station apparatus of FIG. 1.

According to the present mode, as shown in FIG. 4, for example, the above-described first and second modes of scheduling processing evaluation formula is given a parameter (distribution parameter) which sets (controls) an area and its dispersion having the maximum value (instantaneous radio quality peak) of the evaluation value (vertical axis) with respect to radio quality (lateral axis). Here, the parameter is determined by the evaluation value distribution determiner 35 and set by the evaluation formula setting unit 33. The number of peaks in the evaluation formula can be "1" or greater than "1".

For example, the following formula (3) can be used as an evaluation value formula.

$$\text{value} = \frac{S_{ins}^{\alpha}}{\delta(S_{ave} - \gamma)^{\beta} + \varepsilon} \quad (3)$$

Where $S_{ins}$ is instantaneous Signal-to-Interference plus Noise power Ratio (SINR); $S_{ave}$ is average SINR; $\alpha$ is a parameter which controls effects of the instantaneous SINR; $\beta$ is a parameter which controls effects of the average SINR; $\delta, \gamma, \varepsilon$ are parameters which control the width of the distribution of evaluation values and the position of the peak.

In this evaluation formula (3), $\alpha<\beta$. Thus, to calculate the level of the instantaneous radio quality with respect to the average radio quality, opportunities are given to all the users regardless of the level of the instantaneous radio quality. If priority is to be given to users with low average radio quality, $\beta$ takes a large value. Further, $\delta$, $\gamma$, and $\epsilon$, give the peak position and the width of the evaluation value distribution.

In this manner, parameters $\delta$, $\gamma$, $\epsilon$, are used for controlling an area in which the evaluation value takes the maximum value and its dispersion. Hence, when the evaluation peak is set in an area in which the instantaneous radio quality is high, allocation of radio resources to users whose throughput is high is performed with high priority, so that the system use efficiency is improved. On the contrary, the evaluation value peak is set in an area in which the instantaneous radio quality is low, allocation of radio resources to users whose throughput is low is performed with high priority. The number of times of allocation to users with low throughput becomes large, and the number of times of allocation to users with high throughput becomes small, so that data amount transmitted from each user is averaged, and it is possible to average user throughput. Here, allocation to users whose quality is not higher than the predetermined quality is limited, so that packet loss does not often occur, and system throughput is assured.

The result of system level simulation is described as follows.

Figure 5:
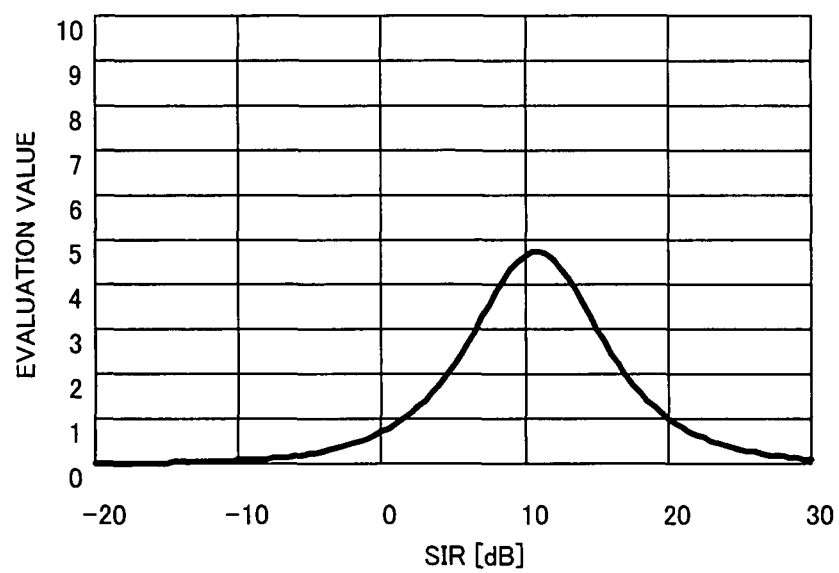
FIG. 5 is a diagram showing evaluation value distribution which is a result of simulation of a third mode.

FIG. 5 shows a distribution example of evaluation value when $\alpha=1$, $\beta=2$, $\gamma=\epsilon=1.25$, $\delta=0.01$, and $S_{ins}=S_{ave}$. In this simulation, adaptive modulation is performed, and the minimum required quality (SINR) of MCS (Modulation and Coding Scheme) applied is about 1.5 dB. In the evaluation value formula (3), parameters $\delta$, $\gamma$, and $\epsilon$ are set so that the evaluation value distribution of an area lower than that becomes small.

The following table shows simulation specification.

System Level Simulation Specification

| Cell construction | 7-cell, 3-sector wrap around |
|---|---|
| Sector construction | 3 dB width = 60°, Front back ratio = 20 dB |
| Propagation loss | L = 136.5 + 37.6log10(R[km]) |
| Shadowing | Standard deviation 8 dB, logarithmic normal distribution |
| $F_d * T_{ave}$ | 2: ($F_d$ = Doppler frequency, $T_{ave}$ = SINR average time) |
| Multi path | 12 paths 1 dB attenuated, 4 samples delayed |
| Band width | 72.828 MHz |
| FFT point | 1024 |
| The number of data sub-carriers | 896 |
| The number of frequency blocks | 16 |
| Framed length | 0.5 ms |
| Symbol length | 14.7 μs (GI = 2.4 μs) |
| The number of users, user analysis | 20 users/sector: uniform distribution in cells |
| MCS | QPSK(R = ½), 16QAM(R = ½, ⅔), 64QAM(R = ½, ⅔, ¾) |
| Traffic | Full buffer |

Figure 6:
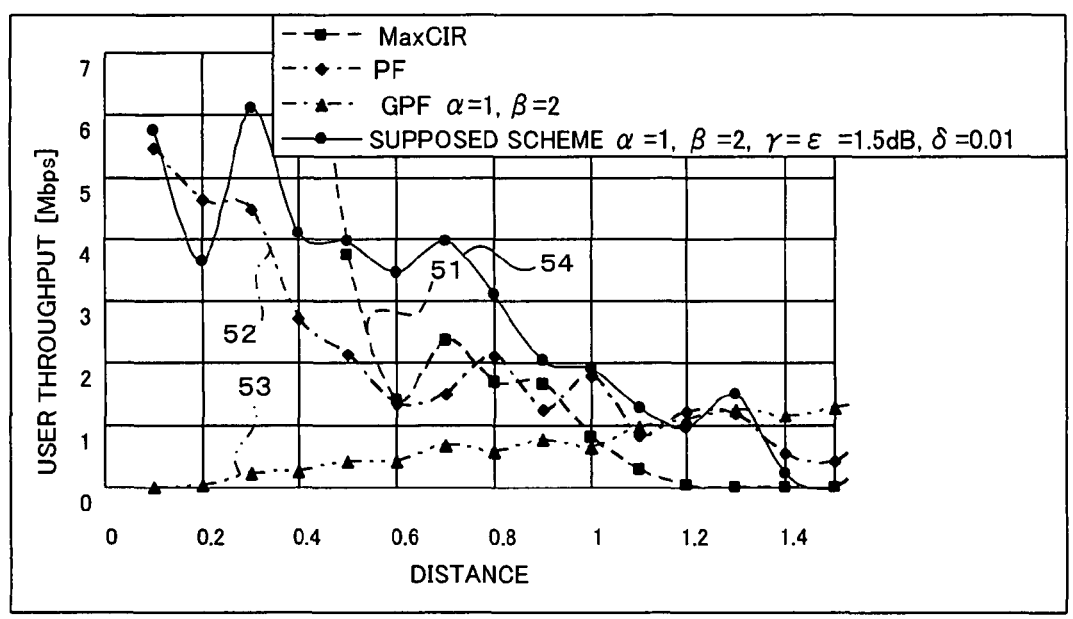
FIG. 6 is a diagram showing an example of normalized distance vs. user throughput distribution for describing effects of the scheduling processing of the third mode in comparison with the previous art.

The user throughput and the sector throughput are obtained with respect to the MaxCIR method, the PF method, the GPF method ($\alpha=1$, $\beta=2$), and the present supposed method. FIG. 6 shows the distribution of user throughput with respect to the distance from the base station, and FIG. 7 shows the normalized sector throughput when the PF sector throughput is "1".

Figure 7:
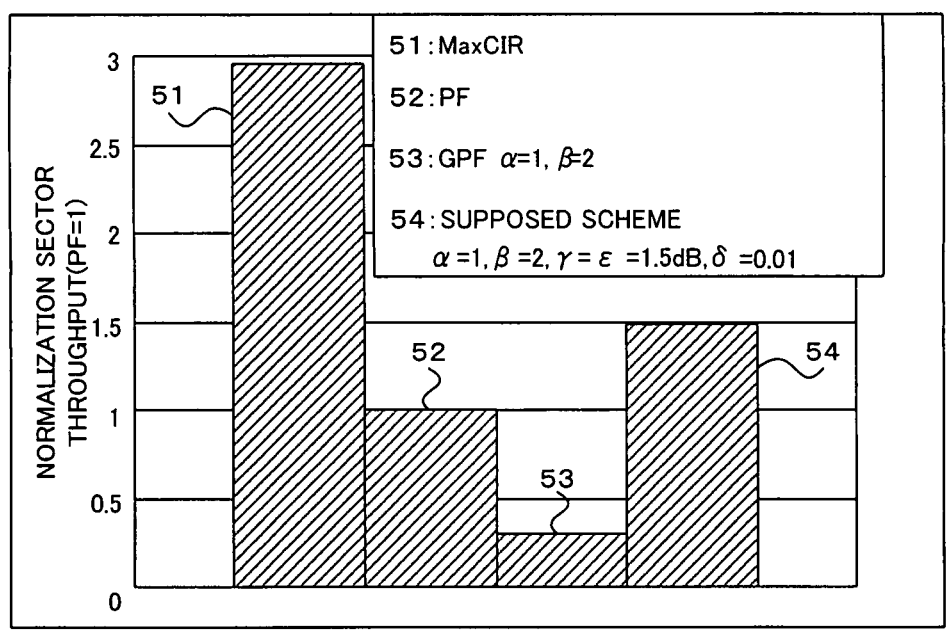
FIG. 7 is a diagram showing an example of normalized sector throughput distribution for describing effects of the scheduling processing of the third mode in comparison with the previous art.

In this instance, in FIG. 6 and FIG. 7, the reference character 51 indicates the simulation result of the simulation of the MaxCIR method; the reference character 52 indicates the result of the simulation of the PF method; the reference character 53 indicates the result of the simulation of the GPF method; the reference character 54 indicates the simulation result of the present supposed method.

As shown in FIG. 6, when using the present supposed method, a high average of user throughput is realized, and the user throughput at cell edges takes equivalent value of the PF method (see reference character 52). In addition, in comparison of the maximum distance realizing the user throughput≥1 Mbps, the MaxCIR method takes a distance of 1. On the other hand, the present supposed method takes a distance of 1.35, taking an equivalent value of PF.

Further, FIG. 7 shows that by means of using the evaluation formula (3) of the present supposed method, the sector throughput 1.5 times higher than the PF method is realized.

(A4) Fourth Mode of Scheduling Processing

Figure 8:
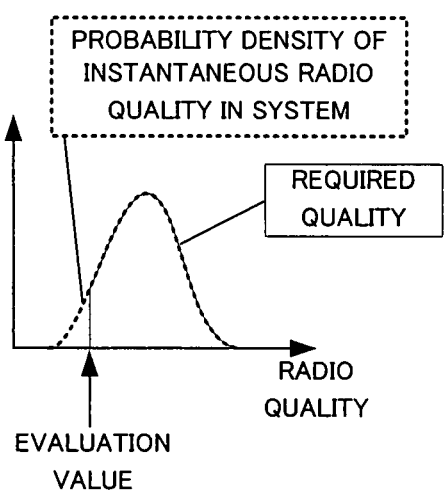
FIG. 8 is a diagram showing an example of probability density distribution of instantaneous radio quality in a system for describing a fourth mode of scheduling processing by the scheduler of the radio base station apparatus of FIG. 1.

Next, according to the present mode, in the scheduling evaluation formula (3) used in the item (A3), the evaluation value distribution with respect to the instantaneous radio quality is set (controlled) to meet the user instantaneous radio quality distribution in the system. For example, as shown in FIG. 8, the base station 1 (evaluation value distribution determiner 35) measures the statistics of instantaneous radio quality of users in the system, and creates the probability density distribution, and makes the distribution not greater than the required quality "0" (or a required window function can be multiplexed) so that the evaluation value in an area not greater than the required quality becomes low, and a part not lower than the required quality can be used as the evaluation value as it is.

That is, the evaluation value distribution determiner 35 is constructed so as to control the distribution characteristic of evaluation values with respect to the instantaneous radio quality in accordance with the statistical distribution of the instantaneous radio quality of the users in the system.

In this manner, since evaluation values are distributed in accordance with user instantaneous radio quality distribution, the number of times of allocation to users located in average radio quality environment in the system is increased, so that the throughput of the user located in average radio quality environment is improved. Further, since users located in good radio environment can send a great amount of data at one time, the number of times of allocation of radio resources becomes fewer. However, their user throughputs become equivalent to that of the users located in the average radio quality environment, so that user throughput in the system is averaged.

(A5) Fifth Mode of Scheduling Processing

According to the present mode, in the above-mentioned first to fourth mode of scheduling processing, instantaneous radio quality at the time of transmission is to be performed is predicted based on user instantaneous radio quality obtained in the past, and the predicted value is used as instantaneous radio quality used in the evaluation formula. The method of prediction is, for example, a method using extrapolation interpolation.

Figure 9:
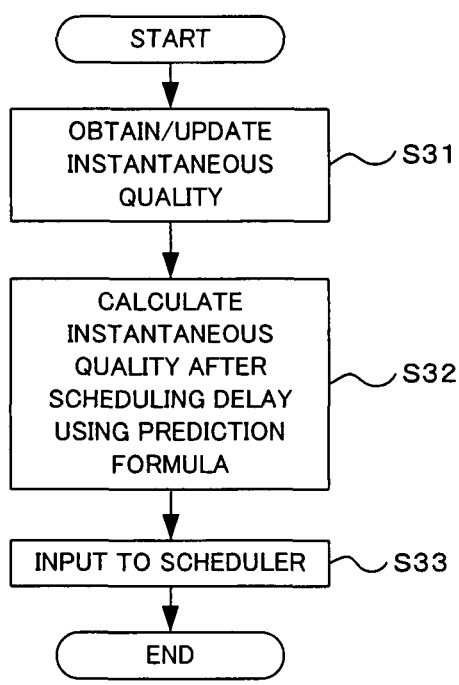
FIG. 9 is a flowchart for describing a fifth mode of scheduling processing by the scheduler of the radio base station apparatus of FIG. 1.

As illustrated in FIG. 9, for example, on the base station 1, when the radio quality information calculator 25 calculates and obtains the instantaneous radio quality information of users at the current time, they are stored in the non-illustrated storage medium such as an internal memory or an register, and the past instantaneous radio quality information is updated (step S31).

Next, the radio quality information calculator 25, using the past instantaneous radio quality information including instantaneous radio quality information at the current time obtained, calculates instantaneous radio quality after scheduling delay using a prediction formula such as a linear interpolation (step S32), and the calculated instantaneous radio quality information is input as instantaneous radio quality used in distribution determination of the evaluation value calculation and/or evaluation value in the scheduler 30 (evaluation value calculator 31 and/or the evaluation value distribution determiner 35)(step S33).

That is, the radio quality information calculator 25 of the present example functions as a instantaneous radio quality predicting means which predicts instantaneous radio quality at the time transmission to the MS 2 is performed from the past instantaneous radio quality of the MS 2 and gives the predicted value to the evaluation value calculator 31 as radio quality information of the evaluation formula.

Hereby, it is possible to perform radio resource allocation in consideration of scheduling delay from the time point that instantaneous radio quality of a user is calculated until practical transmission is performed. Accordingly, it is possible to prevent radio resource allocation such as that instantaneous radio quality becomes lower than the required quality during the scheduling delay time, so that radio resources can be effectively used.

(A6) Sixth Mode of the Scheduling Processing

According to the present mode, it is assumed that retransmission is performed on the basis of HARQ (Hybrid Automatic Request). The required quality (threshold value) used in scheduling processing (evaluation formula) according to the first through fifth modes is set to a value which is lower by a gain (hereinafter will be called HARQ gain) obtained by retransmission combination on the reception end (MS 2) by means of the retransmission control.

Figure 10:
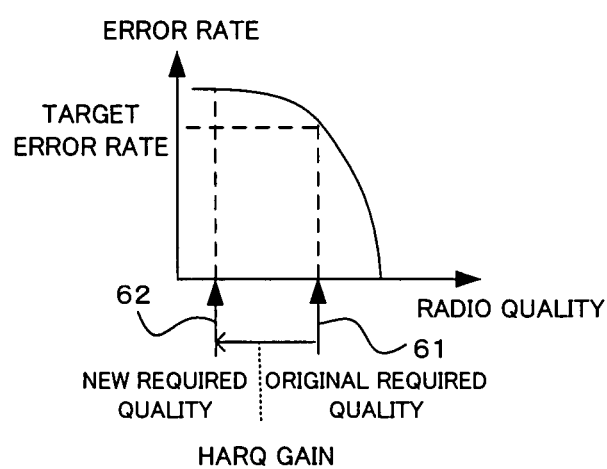
FIG. 10 is a diagram showing an example of instantaneous radio quality vs. target error rate characteristic for describing a sixth mode of scheduling processing by the scheduler of the radio base station apparatus of FIG. 1.

For example, FIG. 10 shows a relationship between an error rate characteristic of the radio scheme and the required quality of the evaluation value of the present mode. The original required quality (see arrow 61) can be determined from the required (target) error rate in the error rate characteristic. The required quality determiner 34 determines the radio quality (see arrow 62) lower, by a HARQ gain, than the original required quality as new required quality in the evaluation formula.

That is, the required quality determiner 34 functions as a retransmission-time required quality control means which controls the required quality in the direction lowering it by an amount corresponding to the HARQ gain.

In this manner, using the fact that the error rate becomes lower than the HARQ gain even if the radio quality at the retransmission is lower than the retransmission quality, it is possible to set (change) the required quality parameter of the evaluation formula to a value lower than the required quality. Accordingly, it becomes possible to realize communication of users with lower instantaneous radio quality, so that the coverage over cells is enlarged.

(A7) Seventh Mode of Scheduling Processing

Next, according to the present mode, the required quality of scheduling processing in the above-described first through sixth mode, is set to a value lower by a gain improvement (hereinafter will be called the repetition code gain) obtained by repetition code in the repletion coding unit 142.

Figure 11:
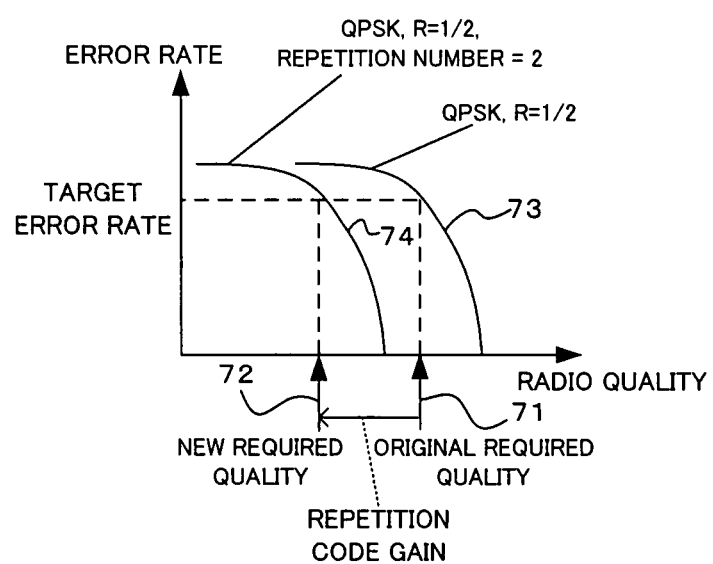
FIG. 11 is a diagram showing an example of instantaneous radio quality vs. target error rate characteristic for describing a seventh mode of scheduling processing by the scheduler of the radio base station apparatus of FIG. 1.

For example, in FIG. 11, a relationship between the error rate characteristic of the radio scheme and the required quality of the evaluation value of the present mode is shown. In FIG. 11, the characteristic 73 presents an error rate characteristic with respect to radio quality when modulation scheme=QPSK and coding rate R=½ (repletion coding number=0), and the characteristic 74 indicates an error rate characteristic with respect to radio quality when the modulation scheme is the same and the coding rate is R, and when the repetition coding number=2.

In this case, also, the original required quality (see arrow 71) can be determined from the required (target) error rate in the error rate characteristics. The required quality determiner 34 determines the radio quality (see arrow 72 (the number of times of repetition=2)] lower than the original required quality by repletion coding gain, as new required quality in the evaluation formula.

That is, the required quality determiner 34 functions as a repetition coding-time required quality controlling means which controls the required quality in the direction lowing the required quality by the amount corresponding the repetition coding gain.

In this manner, by means of setting the required quality parameter of the evaluation formula to a value lower than the original required quality by the repetition coding gain, it becomes possible to realize communication of users with lower instantaneous radio quality, and hence it becomes possible to enlarge cell coverage.

In this instance, the required quality parameters of the evaluation formula can be controlled corresponding to the modulation method of the transmission signal to the MS 2, the coding rate, and the change (control) of transmitter parameter such as transport block size.

(A8) Eighth Mode of Scheduling Processing

Next, in the present mode, parameters used in scheduling processing according to the above-mentioned first through seventh modes are dynamically varied corresponding to user instantaneous radio quality distribution in the system.

For example, the evaluation value distribution determiner 35 monitors the instantaneous radio quality distribution of users in the system, and creates the probability density distribution or the cumulative probability density distribution of the instantaneous radio quality, and compares the distribution at the time of the previous parameter creation (stored in a storage medium such as an internal memory not illustrated) with the distribution created at the present time, to detect change in the distribution. Upon detection of change in distribution, the evaluation value distribution determiner 35 creates evaluation value distribution so as to meet the distribution. In this instance, such functions can be provided in separation with the evaluation value distribution determiner 35.

Then, for example, the peak position of the probability density distribution of the created instantaneous radio quality is taken as the peak position of the evaluation value, and the maximum value and the minimum radio quality of the probability density distribution of the instantaneous radio quality is taken as the maximum value and the minimum value in the radio quality direction of the evaluation value distribution. In use of the cumulative probability density distribution, a value of 50% can be set as a peak position in spite of the peak position. The parameters lead-through is set as a parameter of the evaluation formula through the evaluation formula setting unit 33.

That is, the evaluation value distribution determiner 35 has functions as a distribution detector 351 which detects change in the instantaneous radio quality distribution (statistic distribution) and as a parameter resetting unit 352 which dynamically reset, when the above function detects the distribution variation, parameters relating to the evaluation value calculation according to the characteristic of the statistic distribution after change (refer to FIG. 1).

In this instance, the above-described distribution monitoring (distribution calculation) and the distribution comparison can be performed regularly or irregularly. In addition, a parameter can be created (set) only when the distribution is varied by an amount greater than the predetermined threshold value.

An explanation will be made in a case where the following evaluation formula (4) is used as a concrete example.

$$\text{value} = \frac{S_{ins}}{\delta(S_{ave} - \gamma)^2 + S_{ave}} \quad (4)$$

where $S_{ins}$ is instantaneous SINR; $S_{ave}$ is average SINR; $\delta$ is a parameter controlling the spread of the evaluation value; and $\gamma$ is a parameter controlling the peak position of the evaluation value.

The formula (4) has a characteristic such that greater $\delta$ realizes smaller spread, and greater $\gamma$ realizes greater position of the peak.

Figure 12:
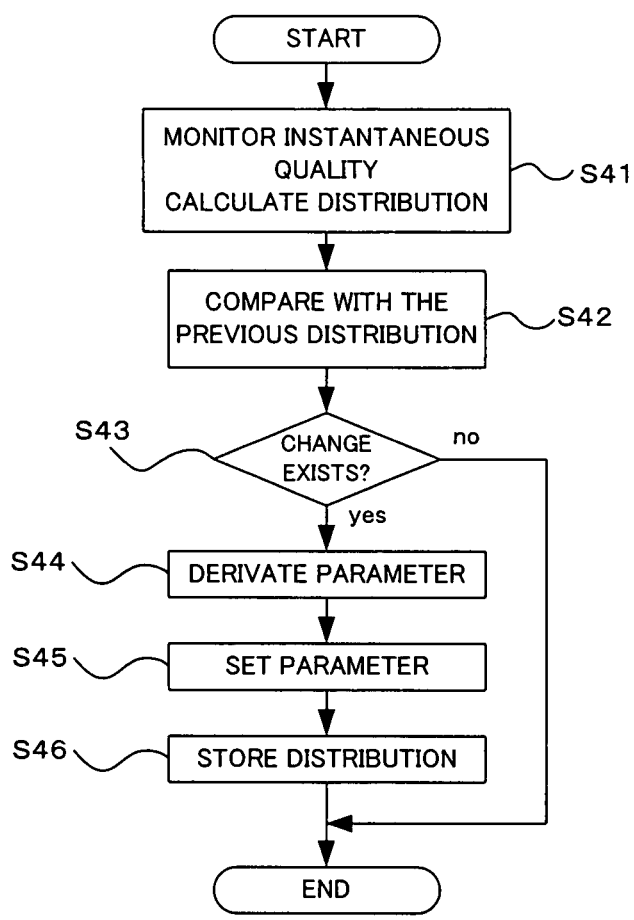
FIG. 12 is a flowchart for describing an eighth mode of scheduling processing by the scheduler of the radio base station apparatus of FIG. 1.

FIG. 12 shows the distribution parameter determination flow of the present mode.

First of all, the base station 1 (evaluation value distribution determiner 35), in cooperation with the radio quality information calculator 25, monitors instantaneous radio quality in the system, and creates the distribution of the instantaneous radio quality (step S41). The distribution can be probability density distribution or cumulative probability density distribution.

Next, the evaluation value distribution determiner 35 compares the distribution resultantly created by the monitoring with the distribution of the previous parameter setting (step S42). As a result, when variation of the distribution is detected (determined yes at step S43), parameters $\delta$ and $\gamma$ of the evaluation, formula (4) are lead through so that the evaluation value distribution overlaps the new distribution (step S44). Parameter $\gamma$ can take the peak position of the probability distribution of the instantaneous radio quality distribution, or a value of 50% value of the cumulative probability density distribution. Parameter $\delta$ is set so that the maximum and the minimum value of the evaluation value distribution in the radio quality direction overlap the maximum and the minimum value of the instantaneous radio quality distribution.

Upon determining parameters, the evaluation value distribution determiner 35, in cooperation with the evaluation formula setting unit 33, sets the parameters to the above evaluation formula (4) used by the evaluation value calculator 31 (step S45). In preparation to the next distribution variation detection, the evaluation value distribution determiner 35 stores the present (new) radio quality distribution in a storage medium such as the above-mentioned storage medium (step S46). Here, if the distribution variation is not detected, resetting of parameters is not performed, and the processing ends (no route of step S43).

In this manner, according to the present mode, parameters of the evaluation formula (4) are dynamically set (controlled) to appropriate values at scheduling timings in accordance with change in instantaneous radio quality distribution in the system. Thus, it becomes always possible to perform radio resource allocation with optimal evaluation value distribution in accordance with change in instantaneous radio quality distribution, so that it is possible to support (follow) change in radio environment such as movement of users.

(A9) Ninth Mode of Scheduling Processing

In the present mode, assuming that retransmission control based on HARQ is performed, the required quality (threshold) used in scheduling processing (evaluation formula) of the above-mentioned first through eighth mode is dynamically changed in accordance with the presence or absence of NACK. For example, when NACK is not received, the base station 1 (scheduler 30) uses the original required quality having been already set. When NACK is received, it is changed to required quality defined for the time NACK is received.

Figure 13:
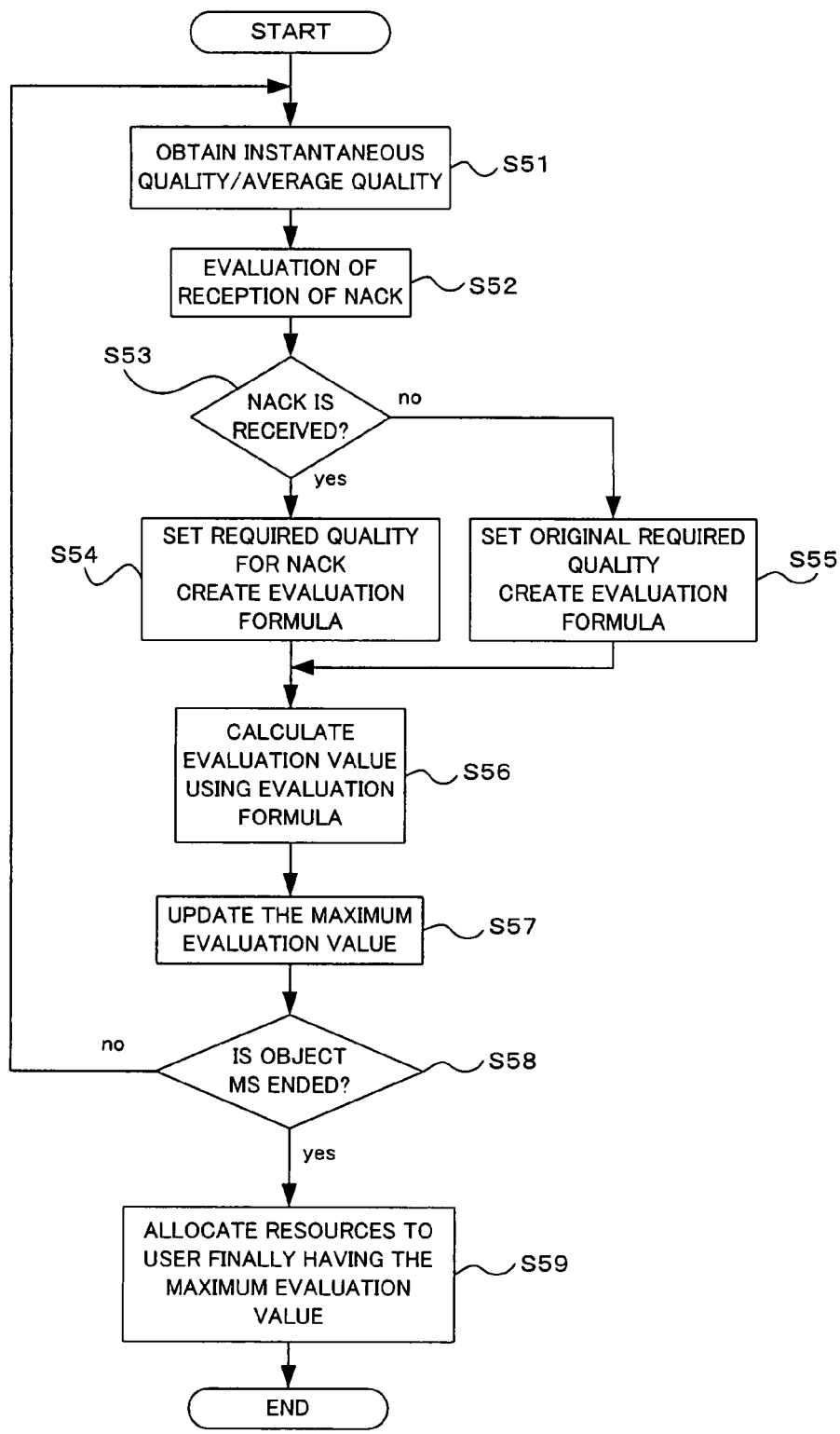
FIG. 13 is a flowchart for describing a ninth mode of scheduling processing by the scheduler of the radio base station apparatus of FIG. 1.

FIG. 13 shows a scheduling flow of the present mode.

First of all, the scheduler 30 (evaluation value calculator 31) obtains, from the radio quality information calculator 25, the instantaneous radio quality information and average radio quality information of an MS 2 which is the subject of scheduling (step S51). Further, the NACK reception evaluator 24 evaluates whether or not NACK is received (step S52). If the evaluation result is negative (evaluated no at step S53), the required quality determiner 34 does not change the required quality used in the evaluation value calculator 31 and uses the original required quality. The required quality determiner 34 then creates an evaluation formula, and sets it in the evaluation value calculator 31 in cooperation with the evaluation formula setting unit 31 (step S55). The evaluation formula created and set at this time can be any of the already described evaluation formulas.

On the other hand, if the NACK reception evaluator 24 evaluates that NACK is received (evaluated yes at step S53), the required quality determiner 34 sets the required quality defined for the time NACK is received (threshold value at the time of NACK reception) as required quality of the evaluation formula used by the evaluation value calculator 31. The required quality determiner 34 also creates an evaluation formula for the time NACK is received and sets the formula to the evaluation value calculator 31 in cooperation with the evaluation formula setting unit 33 (step S54). Here, when NACK is received, the reception end (user) can obtain an HARQ gain as already described, and thus, the required quality defined for the time NACK is received is preferably set to quality lower than the above-mentioned original required quality.

That is, the required quality determiner 34 in this case functions as a abnormal reception-time required quality controlling means which controls the required quality in the lower direction when a signal (NACK) indicating abnormal reception is received from the user.

After that, the evaluation value calculator 31 calculates an evaluation value by means of the evaluation formula set by the evaluation formula setting unit 33 on the basis of the instantaneous radio quality information obtained from the radio quality information calculator 25 and average radio quality information (step S56), and stores the calculation result (evaluation value) in a non-illustrated storage means such as an internal memory or a register, thereby updating the evaluation value to the maximum value step by step (step S57). That is, after calculation of the evaluation value, the evaluation value calculator 31 compares the calculated evaluation value with the provisional maximum evaluation value stored in the storage medium. When the present evaluation value currently calculated is larger, the provisional maximum evaluation value is replaced (updated) by the currently calculated evaluation value, and the current user is registered as a provisionally allocated user.

Then, the transmission radio resource/user determiner 32 evaluates whether or not evaluation value calculation is completed for all the users (step S58). If the calculation is not completed (if evaluated no at step S58), the processing of S51 and afterward is repeated until the evaluation calculation is completed for all the users (until evaluated yes at step S58).

When the evaluation value calculation is completed for all the users, the transmission radio resource/user determiner 32 determines the user who is finally registered as a provisional allocated user (the user having the maximum evaluation value finally stored in the storage medium) as a user to whom radio resources is to be allocated (from yes route of step S58 to step S59).

In this manner, according to the present mode, the presence or absence of NACK reception is monitored for each user (MS 2) who is the subject of scheduling. If NACK is received, it is possible to change the required quality (threshold value) of the evaluation value calculation (in the direction lowering than the original required quality) Thus, it becomes possible for the user lower in the instantaneous radio quality to perform communication, so that coverage of a cell is enlarged.

As detailed above, according to the present invention, it is possible to restrain allocation of radio resources to mobile terminals (users) whose instantaneous radio quality is lower than the required radio quality, so that an area covered by radio service (coverage) can be assured, and so that the efficiency of use of the system (radio resources) is improved. Thus, the present invention is significantly useful in the radio communication technology field.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall with metes and bounds of the claims, or equivalence of such metes and bounds thereof are therefore intended to be embraced by the claims.

What is claimed is:

1. A scheduler which allocates radio resources to mobile terminals in a radio mobile communication system, said scheduler comprising:
   a calculator which calculates, for each of the mobile terminals which are the objects of scheduling, an evaluation value relating to priority of allocation of radio resources by a predetermined evaluation formula including radio quality information relating to radio quality between a base station and the mobile terminal;
   a controller which controls the evaluation value so that the priority of allocating a radio resource to a mobile terminal, whose instantaneous radio quality is determined to be lower than a required radio quality, becomes lower than the priority of allocating a radio resource to a mobile terminal, whose instantaneous radio quality is determined to be equal to or higher than the required radio quality; and
   an evaluation value distribution controller which gives, to the evaluation value formula, a parameter for controlling the region of the maximum value and the dispersion as distribution characteristics of the evaluation value with respect to the instantaneous radio quality, wherein
   said evaluation value distribution controller controls the distribution characteristics of the evaluation value with respect to the instantaneous radio quality, corresponding to the statistical distribution of the instantaneous radio quality with respect to the mobile terminal of the radio mobile communication system.

2. A scheduler as set forth in claim 1, wherein the evaluation formula is an evaluation formula which gives allocation opportunities to all of the mobile terminals.

3. A scheduler as set forth in claim 1, further comprising an instantaneous radio quality predictor which predicts instantaneous radio quality at the time when transmission is performed to the mobile terminal on the basis of the past instantaneous radio quality of the mobile terminal, and gives the prediction value to said evaluation value calculator as the radio quality information of the evaluation formula.

4. A scheduler as set forth in claim 1,
   wherein said mobile terminal is a terminal which performs retransmission combination with respect to a reception signal; and
   wherein said mobile terminal further comprises a retransmission-time required quality controller which controls the required radio quality in the lowering direction corresponding to the gain obtained by the retransmission combination.

5. A scheduler as set forth in claim 1,
   wherein the radio mobile communication system is a system in which coding of a transmission signal to the mobile terminal is repeatedly performed, and
   wherein the system further comprises a repetition coding-time required quality controller which controls the required radio quality so as to be lowered by a gain obtained by the repetition coding.

6. A scheduler as set forth in claim 1, wherein said evaluation value distribution controller includes:
   a distribution detecting unit which detects change in the statistical distribution;
   a parameter resetting unit which dynamically resets, when said distribution detecting unit detects the above-mentioned change, parameters relating to the calculation of the evaluation value in accordance with the characteristics after the above-mentioned change.

7. A scheduler as set forth in claim 1, further comprising an abnormal reception-time required quality controller which controls, when a signal indicating abnormal reception is received from said mobile terminal, the required radio quality in the lowering direction.

8. A radio base station, comprising:
   a scheduler which allocates radio resources to mobile terminals in a radio mobile communication system, said scheduler including: a calculator which calculates, for each of the mobile terminals which are the objects of scheduling, an evaluation value relating to priority of allocation of radio resources by a predetermined evaluation formula including radio quality information relating to radio quality between a base station and the mobile terminal;
   a controller which controls the evaluation value so that the priority of allocating a radio resource to a mobile terminal, whose instantaneous radio quality is determined to be lower than a required radio quality, becomes lower than the priority of allocating a radio resource to a mobile terminal, whose instantaneous radio quality is determined to be equal to or higher than the required radio quality;
   an evaluation value distribution controller which gives, to the evaluation value formula, a parameter for controlling the region of the maximum value and the dispersion as distribution characteristics of the evaluation value with respect to the instantaneous radio quality; and
   a transmitter which performs transmission to the mobile terminal using the radio resources allocated by said scheduler, wherein
   said evaluation value distribution controller controls the distribution characteristics of the evaluation value with respect to the instantaneous radio quality, corresponding to the statistical distribution of the instantaneous radio quality with respect to the mobile terminal of the radio mobile communication system.

9. A scheduling method in which radio resource is allocated to mobile terminals in a radio mobile communication system, said method comprising:
- calculating, for each of the mobile terminals which are the objects of scheduling, an evaluation value relating to priority of allocation of radio resources by a predetermined evaluation formula including radio quality information relating to radio quality between a base station and the mobile terminal;
- controlling the evaluation value so that the priority of allocating a radio resource to a mobile terminal, whose instantaneous radio quality is determined to be lower than a required radio quality, becomes lower than the priority of allocating a radio resource to a mobile terminal, whose instantaneous radio quality is determined to be equal to or higher than the required radio quality; and
- giving, to the evaluation value formula, a parameter for controlling the region of the maximum value and the dispersion as distribution characteristics of the evaluation value with respect to the instantaneous radio quality, wherein
- in the controlling evaluation value distribution characteristic, controlling of the distribution characteristics of the evaluation value with respect to the instantaneous radio quality is performed, corresponding to the statistical distribution of the instantaneous radio quality with respect to the mobile terminal of the radio mobile communication system.

10. A scheduling method as set forth in claim 9, wherein the evaluation formula is an evaluation formula which gives allocation opportunities to all of the mobile terminals.

11. A scheduling method as set forth in claim 9, further comprising: predicting instantaneous radio quality at the time when transmission is performed to the mobile terminal on the basis of the past instantaneous radio quality of the mobile terminal; and giving the prediction value to said evaluation value calculating as the radio quality information of the evaluation formula.

12. A scheduling method as set forth in claim 9,
- wherein the mobile terminal is a terminal which performs retransmission combination with respect to a reception signal; and
- wherein controlling of the required radio quality in the lowering direction corresponding to the gain obtained by the retransmission combination is performed.

13. A scheduling method as set forth in claim 9,
- wherein the radio mobile communication system is a system in which coding of a transmission signal to the mobile terminal is repeatedly performed, and
- wherein the system further controls the required radio quality so as to be lowered by a gain obtained by the repetition coding.

14. A scheduling method as set forth in claim 9, wherein in the controlling the evaluation value distribution characteristic, when detecting change in the statistical distribution, parameters relating to the calculation of the evaluation value is dynamically reset in accordance with the characteristics of the statistic distribution after the above-mentioned change.

15. A scheduling method as set forth in claim 9, further comprising controlling, when a signal indicating abnormal reception is received from the mobile terminal, the required radio quality in the lowering direction.

* * * * *